US012737503B1

(12) United States Patent
Razinkov et al.

(10) Patent No.: US 12,737,503 B1
(45) Date of Patent: Sep. 15, 2026

(54) DEVICE AND METHOD WITH CONTROLLED USE OF KEYS IN KEY SLOTS OF HARDWARE SECURITY MODULE (HSM) KEY VAULT

(71) Applicant: Marvell Asia Pte Ltd, Singapore (SG)

(72) Inventors: Dmytro Razinkov, Karlsruhe (DE); Tong Liu, Northborough, MA (US); Minda Zhang, Westford, MA (US)

(73) Assignee: Marvell Asia Pte Ltd, Singapore (SG)

( * ) Notice: Subject to any disclaimer, the term of this patent is extended or adjusted under 35 U.S.C. 154(b) by 35 days.

(21) Appl. No.: 18/934,948

(22) Filed: Nov. 1, 2024

Related U.S. Application Data

(60) Provisional application No. 63/547,262, filed on Nov. 3, 2023.

(51) Int. Cl.
*G06F 21/78* (2013.01)
*G06F 21/31* (2013.01)
*G06F 21/60* (2013.01)

(52) U.S. Cl.
CPC .............. *G06F 21/78* (2013.01); *G06F 21/31* (2013.01); *G06F 21/602* (2013.01)

(58) Field of Classification Search
CPC ......... G06F 21/78; G06F 21/31; G06F 21/602
See application file for complete search history.

(56) References Cited

U.S. PATENT DOCUMENTS 6,532,451 B1 * 3/2003 Schell .................. G06Q 20/383 713/180
7,937,595 B1 * 5/2011 Kumar .................... G06F 21/10 713/192
9,104,678 B1 * 8/2015 Nemes .................. G06F 16/235
9,385,871 B2 * 7/2016 Kang .................... G06F 21/445
9,904,806 B2 2/2018 Ju
10,356,087 B1 * 7/2019 Vetter ................. H04L 63/0838
11,025,598 B1 * 6/2021 Laghaeian .......... H04L 63/0435
11,265,160 B2 3/2022 Schmatz et al.
(Continued)

OTHER PUBLICATIONS

Blue Goat Cyber, "A Guide to Hardware Security Modules (HSMs)," Downloaded from https://bluegoatcyber.com/blog/a-guide-to-hardware-security-modules-hsms/ on Sep. 3, 2024.
(Continued)

*Primary Examiner* — Aravind K Moorthy
(74) *Attorney, Agent, or Firm* — Hamilton, Brook, Smith & Reynolds, P.C.

(57) ABSTRACT

A device and corresponding method control use of keys in key slots of a Hardware Security Module (HSM) key vault. The device comprises the HSM key vault and a HSM. The HSM stores a key for use in a cryptographic operation and slot key-information of the key in a key slot of the key slots. The slot key-information includes a key type of the key. The key slots are available for storing the key irrespective of the key type. The key type is associated with the cryptographic operation. The HSM controls use of the key based on a decision to grant or deny a request that includes request key-information and a slot identifier of the key slot. The HSM locates the key slot via the slot identifier, makes the decision based on the request key-information and slot key-information, and outputs a response to the request that indicates the decision made.

32 Claims, 7 Drawing Sheets

(56) References Cited

U.S. PATENT DOCUMENTS 11,354,659 B1 * 6/2022 Krueger ........ G07F 7/088
11,398,904 B1 * 7/2022 Katz ........ H04L 9/0869
11,706,207 B1 * 7/2023 Fynaardt ........ G06F 9/547
11,848,754 B1 * 12/2023 Dods ........ H04L 9/0891
11,882,117 B1 * 1/2024 Kumar ........ G06F 21/602
11,941,131 B1 * 3/2024 Satpathy ........ G06F 15/7807
12,095,909 B1 * 9/2024 Campagna ........ H04L 9/0822
12,306,762 B1 * 5/2025 Huberty ........ G06F 12/0862
12,362,914 B1 * 7/2025 Ibrahim ........ H04L 9/3234
12,388,637 B2 * 8/2025 Griera ........ H04L 9/0894
12,407,506 B2 * 9/2025 Du ........ H04L 9/14
12,413,421 B2 * 9/2025 Ponnuru ........ H04L 9/3268
12,541,608 B1 * 2/2026 Chacko ........ G06F 21/6209
2003/0061494 A1 * 3/2003 Girard ........ G06F 21/78 713/189
2003/0177401 A1 9/2003 Arnold et al.
2003/0236987 A1 * 12/2003 Griffin ........ G06F 21/602 713/189
2005/0074125 A1 * 4/2005 Chavanne ........ H04L 9/0822 380/278
2005/0235342 A1 * 10/2005 Ene-Pietrosanu ........ G06F 21/602 726/6
2006/0122945 A1 * 6/2006 Ripberger ........ G06F 21/10 705/71
2007/0011736 A1 * 1/2007 Kalibjian ........ G06F 21/52 726/14
2007/0113104 A1 * 5/2007 Witt ........ G06F 21/602 713/193
2007/0174329 A1 * 7/2007 Anderson ........ G06F 16/217 707/999.102
2008/0069361 A1 * 3/2008 Cho ........ H04L 9/0891 380/277
2009/0046862 A1 * 2/2009 Ito ........ H04L 9/088 380/277
2009/0080649 A1 * 3/2009 Dellow ........ H04L 9/14 380/28
2009/0080656 A1 * 3/2009 Hughes ........ G06F 21/602 380/277
2009/0319802 A1 * 12/2009 Walmsley ........ H04L 9/3247 713/189
2010/0011028 A1 * 1/2010 Dade ........ G06F 16/2255 707/E17.037
2010/0037069 A1 * 2/2010 Deierling ........ G06F 21/79 713/193
2010/0098246 A1 * 4/2010 Ward ........ G06F 21/34 713/184
2010/0191970 A1 * 7/2010 Singer ........ H04L 9/0869 713/171
2011/0087897 A1 * 4/2011 Nelson ........ H04L 9/0894 713/193
2011/0113237 A1 * 5/2011 Hird ........ G06F 21/34 713/184
2011/0154497 A1 * 6/2011 Bailey, Jr. ........ H04L 63/1433 726/25
2011/0191599 A1 * 8/2011 Chou ........ H04L 9/0877 713/193
2011/0252234 A1 * 10/2011 De Atley ........ H04W 12/082 713/165
2011/0314304 A1 * 12/2011 Braams ........ G06F 21/78 713/193
2012/0102298 A1 * 4/2012 Sengupta ........ G06F 12/0864 711/216
2012/0281839 A1 * 11/2012 Arnold ........ H04L 9/0897 380/277
2013/0054474 A1 * 2/2013 Yeager ........ G06Q 20/385 705/71
2013/0191648 A1 * 7/2013 Bursell ........ G06F 21/602 713/189
2013/0219189 A1 * 8/2013 Simmons ........ H04L 9/0822 713/189
2013/0238581 A1 * 9/2013 Franzki ........ G06F 21/6209 707/705
2013/0326602 A1 * 12/2013 Chen ........ G06F 21/64 726/6
2014/0019773 A1 * 1/2014 Dellow ........ H04L 9/14 713/189
2014/0053001 A1 * 2/2014 Rodgers ........ H04N 19/40 713/193
2014/0136845 A1 * 5/2014 Kim ........ G06F 21/78 713/169
2014/0156708 A1 * 6/2014 Adams ........ G06F 16/168 707/803
2014/0195720 A1 * 7/2014 Akella ........ G06F 12/0246 711/103
2014/0237263 A1 * 8/2014 Suzuki ........ G06F 12/0246 713/193
2014/0258730 A1 * 9/2014 Stecher ........ H04L 9/0861 713/189
2014/0281528 A1 * 9/2014 Dubey ........ G06Q 30/018 713/168
2015/0113285 A1 * 4/2015 Boivie ........ H04L 63/12 713/189
2015/0134953 A1 * 5/2015 Seaborn ........ H04L 63/0428 713/168
2016/0218864 A1 * 7/2016 Mutou ........ G06F 21/602
2016/0315765 A1 * 10/2016 Zheng ........ H04L 9/0894
2016/0335299 A1 * 11/2016 Vemulapati ........ G06F 16/2246
2016/0352516 A1 * 12/2016 Oberheide ........ H04L 9/0897
2017/0039143 A1 * 2/2017 Ritchie ........ G06F 16/9014
2017/0180989 A1 * 6/2017 Etzel ........ G06F 21/602
2017/0285976 A1 * 10/2017 Durham ........ G06F 21/64
2017/0302653 A1 * 10/2017 Ortner ........ H04L 63/0435
2017/0316042 A1 * 11/2017 She ........ G06F 16/2282
2017/0359370 A1 * 12/2017 Humphries ........ G06F 21/6218
2018/0181331 A1 * 6/2018 Asari ........ G06F 12/0875
2018/0192287 A1 * 7/2018 Ozzie ........ H04L 9/0861
2018/0253449 A1 * 9/2018 Feldman ........ G06F 16/21
2019/0007202 A1 * 1/2019 Colombo ........ H04L 9/3239
2019/0028266 A1 * 1/2019 Darmon ........ H04L 9/0662
2019/0132125 A1 * 5/2019 Arroyo ........ H04L 9/0894
2019/0171829 A1 * 6/2019 Tackabury ........ G06F 21/6209
2019/0245704 A1 * 8/2019 Pala ........ H04L 67/34
2019/0297065 A1 * 9/2019 Kanungo ........ H04L 9/0891
2019/0318102 A1 * 10/2019 Araya ........ H04L 9/0897
2019/0342079 A1 * 11/2019 Rudzitis ........ G06F 21/602
2019/0354692 A1 * 11/2019 Thoram ........ H04L 9/0819
2020/0014688 A1 * 1/2020 Kohli ........ H04L 9/0891
2020/0082059 A1 * 3/2020 Vembu ........ H04N 21/4627
2020/0151319 A1 * 5/2020 Sharma ........ H04W 12/084
2020/0153613 A1 * 5/2020 Hale ........ G06F 21/107
2020/0226263 A1 * 7/2020 Patel ........ G06F 21/602
2020/0266982 A1 8/2020 Schmatz et al.
2020/0311015 A1 * 10/2020 Xu ........ G06F 9/5022
2021/0075607 A1 * 3/2021 Li ........ H04L 9/0897
2021/0103584 A1 * 4/2021 Fretz ........ G06F 16/2255
2021/0126801 A1 * 4/2021 Nix ........ G06F 7/588
2021/0200882 A1 * 7/2021 Maor ........ H04L 9/0897
2021/0218555 A1 * 7/2021 Mastenbrook ........ H04L 9/0825
2021/0258151 A1 * 8/2021 Cristina ........ G06F 21/602
2021/0306139 A1 * 9/2021 Wright ........ H04L 9/0869
2021/0377247 A1 * 12/2021 Nigro ........ H04L 9/3239
2022/0014918 A1 * 1/2022 Mastenbrook ........ G06F 21/64
2022/0019698 A1 * 1/2022 Durham ........ H04L 9/0841
2022/0067221 A1 * 3/2022 Schiattarella ........ H04L 9/088
2022/0173886 A1 * 6/2022 Sardesai ........ H04L 9/0819
2022/0207156 A1 * 6/2022 Satpathy ........ G06F 21/602
2022/0237202 A1 * 7/2022 Orun ........ G06F 16/254
2022/0311605 A1 * 9/2022 Hansen ........ H04L 9/0866
2022/0321331 A1 * 10/2022 Kisley ........ H04L 9/3066
2022/0329413 A1 * 10/2022 Schindewolf ........ G06F 21/602
2022/0343029 A1 * 10/2022 Sultana ........ G06F 21/71
2022/0400007 A1 * 12/2022 Yoshida ........ H04L 9/088
2023/0040577 A1 * 2/2023 Buendgen ........ G06F 21/53
2023/0104332 A1 4/2023 Lambert et al.
2023/0109647 A1 * 4/2023 Ott ........ H04L 9/0618 713/189
2023/0145340 A1 * 5/2023 Cucu ........ G06F 16/182 380/277
2023/0152987 A1 * 5/2023 Kim ........ G06F 3/0623 711/163

(56) References Cited

U.S. PATENT DOCUMENTS

2023/0188326 A1* 6/2023 Lee .................... H04L 9/0825
2023/0195653 A1* 6/2023 Franke ................ G06F 12/1054 711/163
2023/0259618 A1* 8/2023 Veshchikov ............ G06F 21/75 726/23
2023/0267235 A1* 8/2023 Rao .................... G06F 21/72 713/192
2023/0274008 A1* 8/2023 Kettlewell ............ G06F 21/604 726/17
2023/0289453 A1* 9/2023 Hendrickson ......... G06F 21/602
2023/0291548 A1* 9/2023 Mastenbrook ........ H04L 9/0825
2023/0291579 A1* 9/2023 Mastenbrook ........ H04L 9/0844
2023/0299953 A1* 9/2023 Doi .................... H04L 9/0852 380/255
2023/0403146 A1* 12/2023 Duggirala ............ G06F 3/0656
2023/0409535 A1* 12/2023 Kashi Visvanathan .................... G06F 11/1417
2023/0412375 A1* 12/2023 Bisht .................. G06F 11/1417
2024/0039704 A1* 2/2024 Du ..................... H04L 9/0822
2024/0045602 A1* 2/2024 Joshi .................. G06F 3/0623
2024/0048388 A1* 2/2024 Yamada ............... H04L 9/3234
2024/0054236 A1* 2/2024 Moyal .................. G06F 16/285
2024/0078379 A1* 3/2024 Anil .................... G06N 3/045
2024/0126760 A1* 4/2024 Lui .................... G06F 16/24542
2024/0154785 A1* 5/2024 Shin ................... H04L 9/008
2024/0176913 A1* 5/2024 Buendgen .............. G06F 21/72
2024/0184896 A1* 6/2024 Anumulapally ........ G06F 21/57
2024/0185107 A1* 6/2024 Diluoffo ............... G06N 10/20
2024/0193255 A1* 6/2024 Quinlan ............... H04L 9/0894
2024/0205226 A1* 6/2024 Lukyanov ............. H04L 63/102
2024/0289471 A1* 8/2024 Gomez .................. G06F 21/64
2024/0291635 A1* 8/2024 Morshed .............. H04L 9/0894
2024/0330205 A1* 10/2024 Moyes ................ G06F 12/1408
2024/0338237 A1* 10/2024 Jiang .................. G06F 21/79
2024/0388900 A1* 11/2024 Cho .................... G06F 9/547
2025/0004666 A1* 1/2025 Muthiah .............. G06F 3/0622
2025/0008323 A1* 1/2025 Choyi ................. H04W 12/0433
2025/0028842 A1* 1/2025 Beveridge ............ G06F 21/602
2025/0061186 A1* 2/2025 Sharma ................ H04L 9/3247
2025/0094549 A1* 3/2025 Donthula .............. G06F 21/31
2025/0124140 A1* 4/2025 Devolder .............. G06F 21/602
2025/0217519 A1* 7/2025 Kettlewell ............. H04L 9/32
2025/0286702 A1* 9/2025 Masunaga .............. H04L 9/16
2026/0023855 A1* 1/2026 Dang .................... G06F 21/575

OTHER PUBLICATIONS

Schaad, J. and R. Housley, "Advanced Encryption Standard (AES) Key Wrap Algorithm", RFC 3394, DOI 10.17487/RFC3394, Sep. 2002, Downloaded from https://www.ietf.org/rfc/rfc3394.txt on Sep. 3, 2024.

Wikipedia, "Hardware security module," Downloaded from https://en.wikipedia.org/wiki/Hardware_security_module on Sep. 3, 2024.

* cited by examiner

DEVICE AND METHOD WITH CONTROLLED USE OF KEYS IN KEY SLOTS OF HARDWARE SECURITY MODULE (HSM) KEY VAULT

RELATED APPLICATIONS

This application claims the benefit of U.S. Provisional Application No. 63/547,262, filed on Nov. 3, 2023. This application is related to U.S. Provisional Application No. 63/547,838, filed on Nov. 8, 2023, and U.S. Application No. 18,934,871, entitled "MANAGING COMMUNICATIONS BETWEEN A HARDWARE SECURITY MODULE AND NON-VOLATILE MEMORY," inventor Dmytro Razinkov, filed on 11/2024. The entire teachings of the above applications are incorporated herein by reference.

BACKGROUND

A hardware security module (HSM) is hardware designed to safeguard cryptographic keys and perform cryptographic operations for non-limiting examples. A HSM is typically designed to ensure that such cryptographic operations are performed, securely. Such hardware, that is, the HSM, may be implemented as a standalone device or integrated into a larger system. A HSM that is integrated into a larger system may be referred to as an embedded HSM (eHSM) and may be configured to provide dedicated security functions within a single device. An eHSM may be useful for cases in which space and power constraints make it impractical to use a standalone HSM.

SUMMARY

According to an example embodiment, a device comprises a hardware security module (HSM) key vault including key slots and a HSM. The HSM is configured to store a key for use in a cryptographic operation and slot key-information of the key in a key slot of the key slots. The slot key-information includes a key type of the key. The key slots of the HSM key vault are available for storing the key irrespective of the key type. The key type is associated with the cryptographic operation. The HSM is further configured to control use of the key stored in the key slot based on a decision to grant or deny a request. The request includes request key-information and a slot identifier of the key slot. The HSM is further configured to locate the key slot via the slot identifier, make the decision based on the request key-information of the request and the slot key-information stored in the key slot located, and output a response to the request. The response output indicates the decision made.

Direct access to the HSM key vault may be exclusive to the HSM.

The HSM may be further configured, based on the decision made to grant the request, to perform the cryptographic operation and configure the response output to indicate that the request was performed. The HSM may be further configured, based on the decision made to deny the request, to configure the response output to indicate that the request was not performed.

The key slots may be arranged as an array of key slots and the slot identifier may be an index into the array for non-limiting examples.

Each key slot of the key slots of the HSM key vault may be a general-purpose key slot. The general-purpose key slot may be a reusable key slot for storing keys of different lengths, keys of different key types, and keys for use in different cryptographic operations.

The key slot may include a key length field, key type field, key data field, and key token field for storing a key length of the key, the key type of the key, the key, and a key token for the key, respectively.

The slot key-information may further include a key token. The key token may represent a password for using the key stored in the key slot of the key slots of the HSM key vault.

The slot key-information may further include a key length of the key and a key token for the key. The request key-information may include a request key type, request key length, and request key token. The HSM may be further configured to make the decision based on a result of a comparison of the key type, key length, and key token of the slot key-information to the request key type, request key length, and request key token of the request key-information, respectively.

The HSM may be further configured to make the decision to grant the request based on the result of the comparison indicating that the key type, key length, and key token of the slot key-information match the request key type, request key length, and request key token of the request key-information, respectively. The HSM may be further configured to make the decision to deny the request based on the result of the comparison indicating a mismatch.

The slot key-information may further include a key length of the key and a key token for the key. The request key-information may include a request key type, request key length, and request key token. The request may further include at least one parameter. The HSM may be further configured to make the decision to grant the request based on the key type, key length, and key token of the slot key-information matching a request key type, request key length, and request key token of the request key-information, respectively. The HSM may be further configured to perform the cryptographic operation based on the decision made to grant the request. The cryptographic operation may be performed using the key and the at least one parameter.

The HSM may be further configured to store, in an unencrypted form, the key and the slot key-information in the key slot of the HSM key vault.

The request may be a cryptographic-operation request. The HSM may be further configured to process a load key-set request received from an initiator. The load key-set request may include key-set location information and key-set slot information. The key-set location information may include location information for locating a protected version of a key set. The protected version may be in an encrypted form. To process the load key-set request, the HSM may be further configured to locate the protected version of the key set in a memory based on the location information included in the key-set location information. The memory may be external to the HSM. The HSM may be further configured to load, from the memory, the protected version located in the memory. The HSM may be further configured to use at least one cryptographic key provisioned on the HSM to unprotect the protected version loaded to produce an unprotected version of the key set. The unprotected version of the key set may include, in an unencrypted form, the key, the key type, and a key length of the key. The HSM may be further configured to authenticate the unprotected version of the key set and/or validate same, such that only trusted information is loaded/stored in the HSM key vault, such as disclosed further below with regard to FIG. 7. The HSM may be further configured to generate a respective key token for each key included in the unprotected version of the key set, thereby generating a key token for the key. The HSM may be further configured to store the unprotected version of the key set in the HSM key vault based on the key-set slot information of the load key-set request, thereby storing the key and slot key-information of the key in the key slot. The HSM may be further configured to output a load key-set response to the initiator. The load key-set response may include each respective key token generated.

A cryptographic key of the at least one cryptographic key may be an Advanced Encryption Standard (AES)-based key, or another type of key used for decrypting data, for non-limiting examples. The cryptographic key (used to decrypt and authenticate the loaded key set, that is, the protected version of the key set) may be stored persistently within the HSM or loaded in a key slot of the key slots of the HSM key vault.

The HSM may be further configured to produce a protected version of a key set based on a store key-set request received from an initiator. The key set may include the key, the key type, and a key length of the key stored in the key slot. The HSM may be further configured to store, in memory external to the HSM, the protected version of the key set produced.

For non-limiting example, the HSM may include at least one processor and at least one memory with computer code instructions stored thereon. The at least one processor and the at least one memory, with the computer code instructions, may be configured to cause the HSM to store the key, control use of the key, and output the response. Alternatively, operations of the HSM may be performed via logic that is hardcoded in silicon.

The HSM key vault may be an internal memory of the HSM, an external memory of the HSM, a set of hardware registers of the HSM, or another storage element of the HSM for which direct access is exclusive to the HSM for non-limiting examples.

The device may be a system-on-chip (SoC) and the HSM may be an embedded HSM (eHSM) of the SoC for non-limiting examples.

According to another example embodiment, a method comprises storing a key for use in a cryptographic operation and slot key-information of the key in a key slot of key slots of a hardware security module (HSM) key vault. The slot key-information includes a key type of the key. The key slots of the HSM key vault are available for storing the key irrespective of the key type. The key type is associated with the cryptographic operation. The method further comprises controlling use of the key stored in the key slot based on a decision to grant or deny a request. The request includes request key-information and a slot identifier of the key slot. The controlling includes locating the key slot via the slot identifier and making the decision based on the request key-information of the request and the slot key-information stored in the key slot located. The method further comprises outputting a response to the request. The response output indicates the decision made.

Further alternative method embodiments parallel those described above in connection with the example hardware device embodiment.

According to another example embodiment, an apparatus comprises means for storing a key for use in a cryptographic operation and slot key-information of the key in a key slot of key slots of a hardware security module (HSM) key vault. The slot key-information includes a key type of the key. The key slots of the HSM key vault are available for storing the key irrespective of the key type. The key type is associated with the cryptographic operation. The apparatus further comprises means for controlling use of the key stored in the key slot based on a decision to grant or deny a request. The request includes request key-information and a slot identifier of the key slot. The controlling includes locating the key slot via the slot identifier and making the decision based on the request key-information of the request and the slot key-information stored in the key slot located. The apparatus further comprises means for outputting a response to the request. The response output indicates the decision made.

Further alternative apparatus embodiments parallel those described above in connection with the example hardware device embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
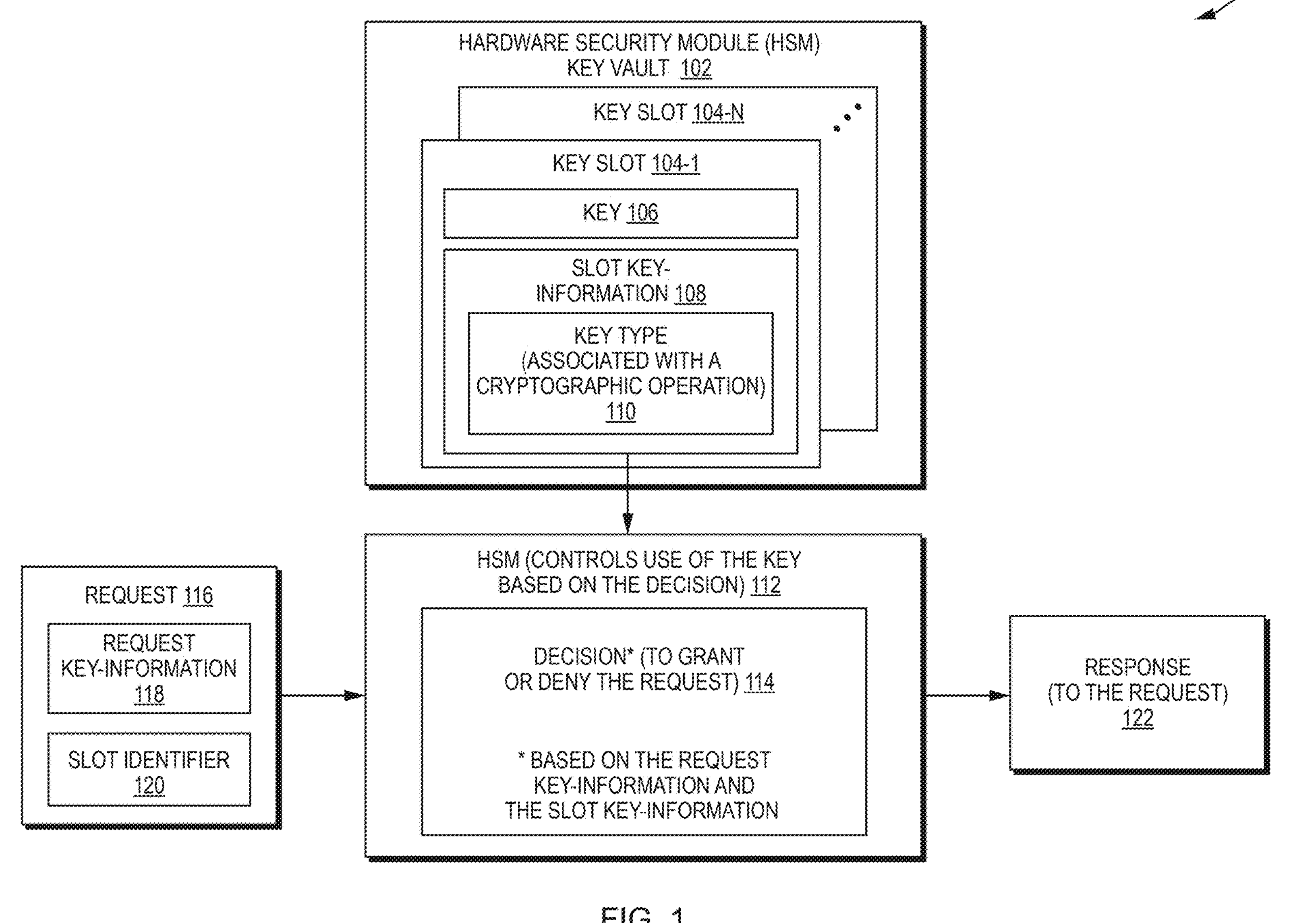
FIG. 1 is a block diagram of an example embodiment of a device.

A description of example embodiments follows.

In general, key wrapping is one of many possible methods known in the art that may be used for key protection. It should be understood that while the term "wrap" may be used with regard to an example embodiment herein, such term does not limit the example embodiment to a key wrapping/unwrapping method and that "wrap" may be referred to interchangeably herein as "protect." Methods other than key wrapping/unwrapping may be employed to ensure confidentiality and authenticity of key information disclosed herein and the term "wrap" does not limit an example embodiment disclosed herein to a key wrapping/unwrapping method or other method for key protection. It should be understood that protection, as referred to herein, ensures confidentiality, integrity and authenticity.

A system-on-chip (SoC), as disclosed herein, is a semiconductor device. A cryptographic engine may be referred to interchangeably herein as a cryptoprocessor and may be a specialized processor configured to perform cryptographic operations. A key may be referred to interchangeably herein as a digital key.

While an example embodiment disclosed herein may be described with regard to an embedded hardware security module (eHSM), it should be understood that the example embodiment is not limited to being employed in an embedded environment and may be employed by a hardware secure module (HSM) implemented as a standalone device. A HSM may be referred to interchangeably herein as an eHSM and vice versa.

To ensure security in a complex embedded system, an example embodiment may employ an embedded hardware security module (eHSM). Digital keys may be stored inside of the eHSM, one time in a provision phase, and may be confined to a boundary of the eHSM. Additional keys may be loaded into the eHSM at runtime, that is, in an execution phase of the system. In such an example embodiment, authenticity and confidentiality of keys outside of the eHSM may be ensured with additional protection, such as via the Advanced Encryption Standard (AES) Key Wrap method or another method designed to protect keys for non-limiting examples.

The keys that are loaded into the eHSM may be used for different cryptographic operations, such as data encryption/decryption, signature generation, and/or Integrity Check Value (ICV) generation for non-limiting examples. Usage of a HSM and protected digital keys is in high demand for embedded software solutions. A total number of such solutions continues to grow, in which support of the HSM and protected digital keys, in parallel, is advantageous.

Conventionally, a dedicated key slot for a specific key type or cryptographic operation is used and such a dedicated key slot is integrated into a hardware cryptographic engine. Different engines and methods may be restricted from using the same key slot. The simultaneous support for different keys may be provided for different keys only if such keys are loaded into independent hardware security modules (HSMs). If different keys need to be used in the same method, a new key of a key type may replace an older key of that same key type in the same key slot.

In some cases, several keys may be used simultaneously, such as for protection of Ethernet switch ports with media access control security (MACsec) defined by the Institute of Electrical and Electronics Engineers (IEEE) standard 802.1AE for non-limiting example. Thus, it is useful for a single (sole) HSM to provide an effective key management to support numerous security use cases and keys at the same time.

To provide such support, an example embodiment may provide key set support, wherein the key set includes a plurality of digital keys. Several of such digital keys may be joined in a bundle. The bundle may be protected via a protection method. According to an example embodiment, a HSM may be configured to provide variable key size support to support cipher suites or cryptographic methods that may use digital keys with different lengths. As such, the HSM may be configured to support loading of key sets that include digital keys of different lengths.

According to an example embodiment, if the protected bundle of keys of a key set is loaded into the HSM, the neighbor key slots may be consumed, and a key may be associated with the key slots in the same order as in the key set. The key size (length) and key type of a key may be protected together with key data of the key and loaded into the key slots all together to ensure association of a key with its respective key size and key type. According to an example embodiment, the key type and key length may not be changeable separately.

According to an example embodiment, a HSM may be configured to support key selection. For example, according to an example embodiment, if several keys are loaded into the HSM at once (simultaneously), each key may be separately selectable to be used as a parameter for a HSM cryptographic operation. To ensure correct key usage, the key may be associated with a respective cryptographic operation(s) that is solely configured to process such key as a parameter. With regard to key access control, an example embodiment of a HSM may be configured to provide limited access to the key to its respective key owner. An example embodiment of such a HSM is disclosed below with regard to FIG. 1.

FIG. 1 is a block diagram of a device 100 that comprises a hardware security module (HSM) key vault 102 including key slots (104-1, . . . , 104-N) and a HSM 112. The HSM 112 may be configured to store a key 106 for use in a cryptographic operation (not shown) and slot key-information 108 of the key 106 in a key slot 104-1 of the key slots (104-1, . . . , 104-N). The slot key-information 108 may include a key type 110 of the key 106. The key slots (104-1, . . . , 104-N) of the HSM key vault 102 may be available for storing the key 106 irrespective of the key type 110. The key type 110 may be associated with the cryptographic operation. The HSM 112 may be further configured to control use of the key 106 stored in the key slot 104-1 based on a decision 114 to grant or deny a request 116. The request 116 may include request key-information 118 and a slot identifier 120 of the key slot 104-1. The HSM 112 may be further configured to locate the key slot 104-1 via the slot identifier 120, make the decision 114 based on the request key-information 118 of the request 116 and the slot key-information 108 stored in the key slot 104-1 located, and output a response 122 to the request 116. The response 122 output may indicate the decision 114 made.

The device 100 may be a system-on-chip (SoC) and the HSM 112 may be an embedded HSM (eHSM) of the SoC for non-limiting examples. The HSM key vault 102 may be an internal memory of the HSM 112, an external memory of the HSM 112, a set of hardware registers of the HSM 112, or another storage element of the HSM 112 for which direct access is exclusive to the HSM 112 for non-limiting examples. According to an example embodiment, keys stored in key slots of the HSM key vault 102 are stored in unencrypted (i.e., plain text) form and, because direct access to the HSM key vault 102 is exclusive to the HSM 112, such keys cannot be accessed in memory by an application as is the case in a conventional system. An example embodiment disclosed herein provides a robust secure way to handle initial key provisioning, for example, at a manufacturing site, and also once deployed, the system software/firmware cannot access those keys.

The HSM 112 may be further configured to store, in an unencrypted form, the key 106 and the slot key-information 108 in the key slot 104-1 of the HSM key vault 102. The response 122 may be output to an initiator (not shown) of the request 116. Direct access to the HSM key vault 102 may be exclusive to the HSM 112. The HSM 112 may be further configured, based on the decision 114 made to grant the request 116, to perform the cryptographic operation and to configure the response 122 output to indicate that the request 116 was performed. The HSM 112 may be further configured, based on the decision 114 made to deny the request 116, to configure the response 122 output to indicate that the request 116 was not performed.

Each key slot of the key slots (104-1, . . . , 104-N) of the HSM key vault 102 may be a general-purpose key slot. The general-purpose key slot may be a reusable key slot for storing keys of different lengths, keys of different key types, and keys for use in different cryptographic operations. According to an example embodiment, a respective key length, key type, and key value, that is, a key, may be provided for each key slot. According to an example embodiment, prior to use of a key slot by a HSM cryptographic operation, the key type and key size (length) of the key in key slot may checked to be applicable for the HSM cryptographic operation. An example embodiment of such a general-purpose key slot that enables such checking is disclosed below with regard to FIG. 2.

Figure 2:
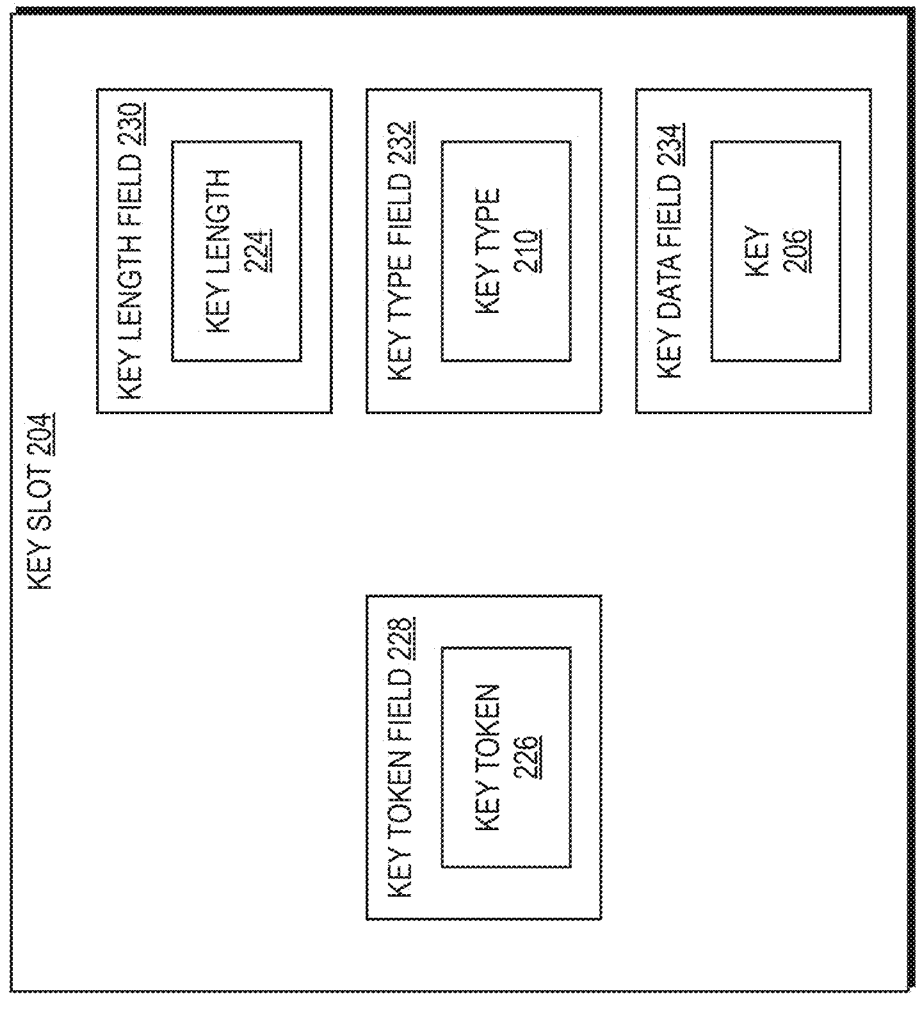
FIG. 2 is a block diagram of an example embodiment of fields of a key slot.

FIG. 2 is a block diagram of an example embodiment of fields of a key slot 204. The key slot 204 includes a key length field 230, a key type field 232, a key data field 234, and a key token field 226 for storing a key length 224 of the key 206, the key type 210 of the key 206, the key 206, and a key token 226 for the key 206, respectively. With reference to FIG. 1 and FIG. 2, the key slot 204 may be a key slot of the key slots (104-1, . . . , 104-N) of the HSM key vault 102.

According to an example embodiment, storing of the key 106 in the key slot 104-1 may include a) generating the key token 226 to produce a generated key token and b) storing the generated key token in the key slot 104-1, that is, in the key token field 226 of the key slot 204. The generated key token may be provided to an initiator (not shown) that caused the storing of the key 106. An owner of the generated key token may be referred to as a key owner and such key owner may be the initiator and may be configured to pass the generated key token to the HSM 112 for key access authorization each time the key 106 is used. Such passing of the generated key token to the HSM 112 may be implemented by including the generated key token in the request key-information 118.

The slot key-information 108 may further include the key token 226. The key token 226 may represent a password for using the key (106, 206) stored in the key slot (104-1, 204) of the key slots (104-1, . . . , 104-N) of the HSM key vault 102. The slot key-information 108 may further include the key length 224 of the key (104-1, 204). The request key-information 118 may include a request key type (not shown), request key length (not shown), and request key token (not shown). The HSM 112 may be further configured to make the decision 114 based on a result of a comparison of the key type (110, 210), key length 224, and key token 226 of the slot key-information 108 to the request key type, request key length, and request key token of the request key-information 118, respectively. The HSM 112 may be further configured to make the decision 114 to deny the request 116 based on the result of the comparison indicating a mismatch.

The request 116 may further include at least one parameter (not shown). The HSM 112 may be further configured to make the decision 114 to grant the request 116 based on the key type (110, 210), key length 224, and key token 226 of the slot key-information 108 matching the request key type, request key length, and request key token of the request key-information 110, respectively. The HSM 112 may be further configured to perform the cryptographic operation based on the decision 114 made to grant the request 116. The cryptographic operation may be performed using the key (106, 206) and the at least one parameter. According to a non-limiting example embodiment, the key slots (104-1, . . . , 104-N) may be arranged as an array, such as disclosed below with regard to FIG. 3.

Figure 3:
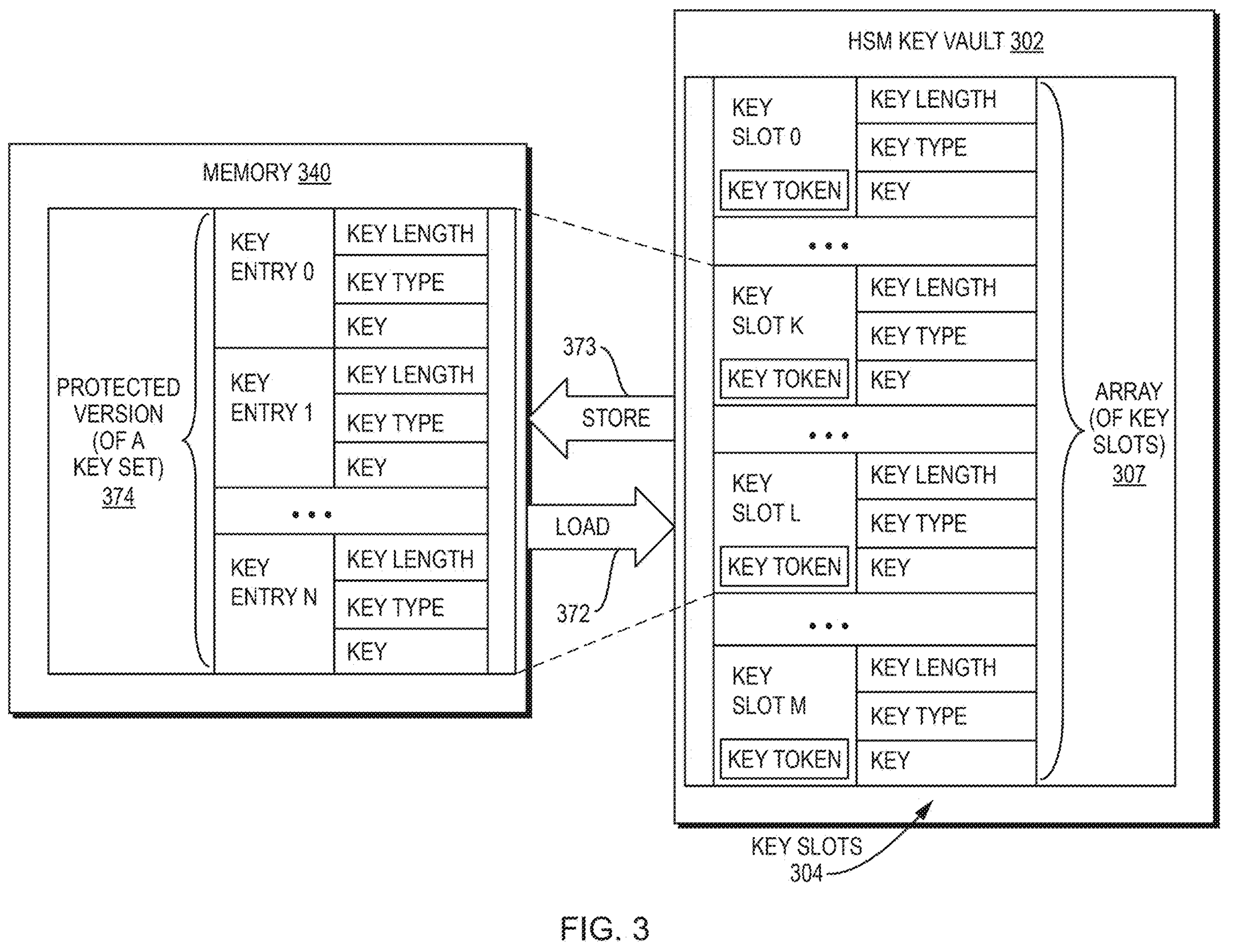
FIG. 3 is a block diagram of an example embodiment of a Hardware Security Module (HSM) key vault.

FIG. 3 is a block diagram of an example embodiment of a HSM key vault 302 that is coupled to memory 340. In the example embodiment of FIG. 3, the key slots 304 of the HSM key vault 302 are arranged as an array 307 of key slots 304. It should be understood, however, that that the key slots 304 are not limited to being arranged in an array. With reference to FIG. 1 and FIG. 3, the HSM key vault 302 may be employed as the HSM key vault 102 and the slot identifier 120 may be an index into the array 307.

According to an example embodiment, content of a key set may be loaded by an initiator (not shown) into the key slots 304 of the HSM key vault 302. Respective content of the key slots 304 may be extracted and placed in a protected key set stored outside of the HSM 302, that is, external to the HSM 302. The protected key set may be referred to as a protected (protected) version 374 of the key set.

In general, the key set may be loaded into any continuous HSM key slot range [e.g., K, . . . , L], wherein (L−K+1) is a total number of keys in the key set. The key slot of a loaded key with index Jin the key set will have an index (K+J) in the slot array. A maximum key slot number (M+1) in the HSM 302 may be larger than a maximum key number (N+1) in the key set, in which case several key sets can be loaded into the HSM 302, simultaneously, that is, at the same time.

According to an example embodiment, each key slot of the key slots 304 may support keys with different lengths. As such, storage for a key of maximal length may be reserved in a key slot of the key slots 304. Each key entry (key entry 0, key entry 1, . . . , key entry N) in the key set may have a different size (length) depending on a respective entry key length and such entries may be processed by the HSM 112 one after another in a chain.

The key type from the key slot may be used by the HSM 112 to check if the key stored in the key slot can be used in a certain cryptographic operation, and if it's used in a proper way. This ensures that the keys are consumed only as expected in pre-defined use cases. The key length, key type, a valid key value, that is, a valid key that is valid based on the key type, may be provided for each key slot. If the HSM 112 detects any invalid/incorrect usage of a key retrieved from a key slot, the cryptographic operation may be forced to fail and the HSM 112 may be configured to report an error.

According to an example embodiment, keys of different lengths and usages may be loaded at once, that is, simultaneously, in the HSM key vault 302. This reduces a start time of an embedded system that may include same and allows to avoid unnecessary replacement of keys in slots, and the repeated check of the same key if it's re-loaded. Since different key types and different key lengths are supported by each key slot, use of the HSM 112 is very flexible and adaptable for different security use cases.

An example embodiment allows loading and use of a protected set of digital keys into the HSM 112, such as the protected version 374 of the key set. If the HSM 112 supports loading of several keys at once, it may use the same or a similar implementation of key slots. The use of key types associated with the cryptographic operations is an indication of the key usage control.

Continuing with reference to FIG. 1 and FIG. 3, according to an example embodiment, a portion of key slots of the key slots 304 may be populated by the HSM 112 based on a load 372 of a protected version 374 of a key set stored in key entries (e.g., key entry 0, key entry 1, . . . key entry N) of the memory 340. The portion may be populated with an unprotected version of the key set by unprotecting the protected version 374, as disclosed further below with regard to FIG. 4. Continuing with reference to FIG. 1 and FIG. 3, the HSM 112 may be configured to protect a different unprotected key set (not shown) that is stored in the key slots 304 to produce another protected version of a key set and store 373 such protected version in the memory 340, which may be the memory 440 of FIG. 4, disclosed below.

Figure 4:
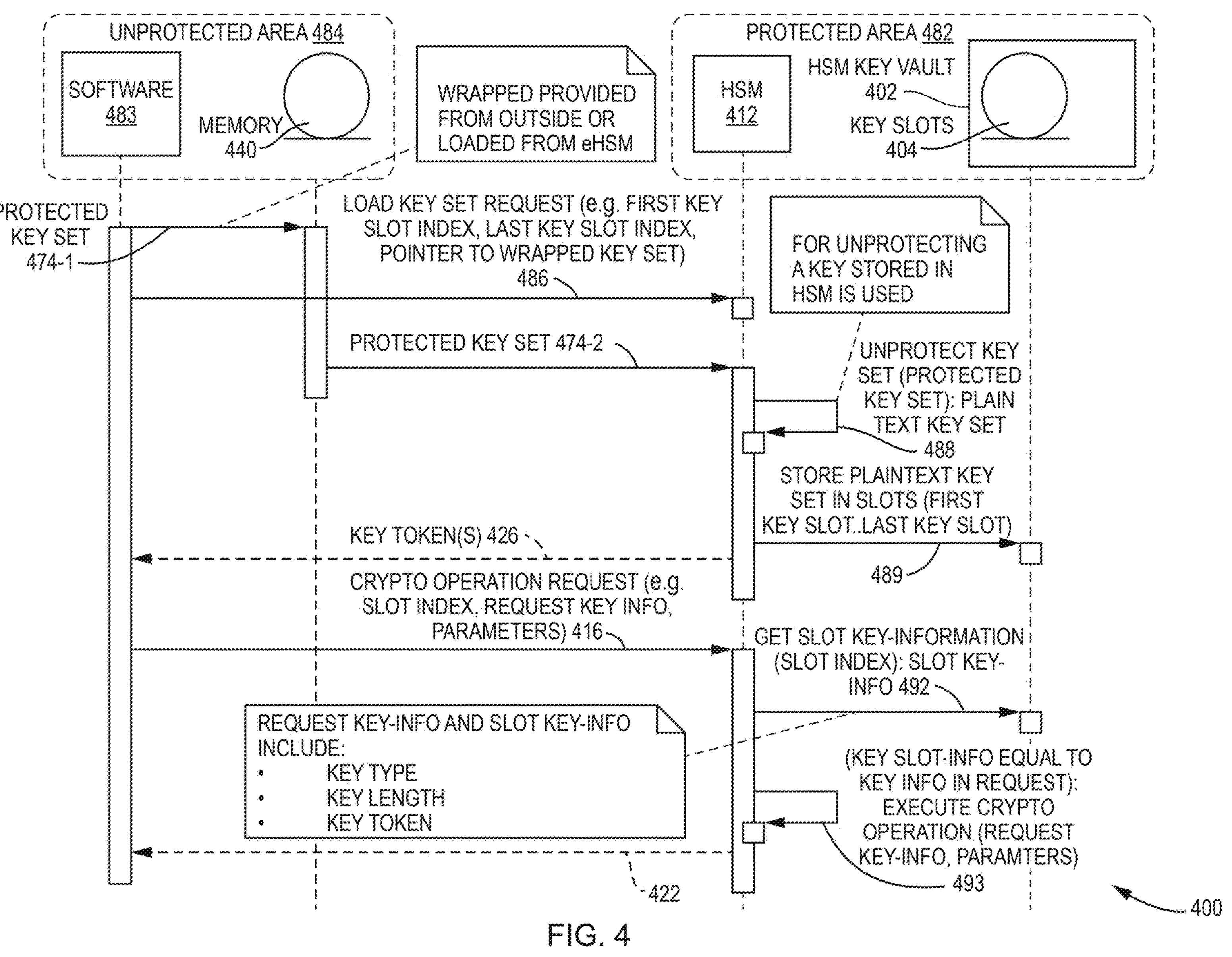
FIG. 4 is a sequence diagram of an example embodiment of interactions with a HSM.

FIG. 4 is a sequence diagram 400 of an example embodiment of interactions with a HSM 412 and HSM key vault

402 that includes key slots 404. The HSM 412 and HSM key vault may be the HSM 112 and HSM key vault 102 of FIG. 1, respectively, disclosed above. Continuing with reference to FIG. 1 and FIG. 4, the HSM key vault 402 includes key slots 404 and the HSM 412 and HSM key vault 402 reside in a protected area 482 of a system (not shown), such as an embedded system of the device 100. The software 483 (applications, etc.) and memory 440 may be located in an unprotected area 483.

In the sequence diagram 400, a protected key 474-1 is stored by the software 483 in the memory 440. The protected key set 474 may be referred to interchangeably herein as a protected version of a key set. The software 483 may send a load key set request 486 to the HSM 412.

The load key-set request 486 may include key-set location information, such as a pointer to the protected key set 474 in the memory 440 for non-limiting example, and key-set slot information, such as a first key slot index and a last key slot index that correspond to respective key slots of the key slots 404 of the HSM key vault 402 for non-limiting example. The key-set location information may include location information for locating a protected version of the key set, that is, the protected key set 474-1. The protected version may be in an encrypted form. To process the load key-set request 486, the HSM may be further configured to locate the protected version of the key set in the memory 440 based on the location information included in the key-set location information. The memory 440 may be external to the HSM 412. The HSM 412 may, in turn, be further configured to load, from the memory 440, the protected version located in the memory 440, that is, the protected key set 474-2.

The HSM 412 may be further configured to use at least one cryptographic key (not shown) provisioned on the HSM 412 to unprotect 488 the protected version loaded to produce an unprotected version of the key set. The unprotected version of the key set may include, in an unencrypted form, the key, the key type, and a key length of the key of each key in the protected key set. The HSM may be further configured to authenticate the unprotected version of the key set and/or validate same, such that only trusted information is loaded/stored in the HSM key vault, such as disclosed further below with regard to FIG. 7.

Continuing with reference to FIG. 4, the load key-set request 486 may be rejected if the authentication fails or validation fails, for example, if a value of the key type is unsupported or if a value of the key length is unsupported for non-limiting examples. The HSM 412 may be further configured to generate a respective key token for each key included in the unprotected version of the key set. The HSM 412 may be further configured to store 489 the unprotected version of the key set in the HSM key vault 402 based on the key-set slot information of the load key-set request 486. The HSM 412 may be further configured to output a load key-set response to an initiator of the load key set request 486, namely the software 483. The load key-set response may include each respective key token generated, that is, the key token(s) 426.

The HSM 412 may be further configured to control use of a key stored in a key slot of the key slots 404 of the key vault 402 based on a decision to grant or deny a request. The request may be a cryptographic (crypto) operation request 416. The crypto operation request 416 may include request key-information, a slot identifier of the key slot, such as a slot index of the key slot for non-limiting example, and at least one parameter. The HSM 412 may be further configured to locate the key slot via the slot identifier, get 492 the slot key-information, make the decision based on the request key-information of the crypto operation request 416 and the slot key-information stored in the key slot located, and output a response 422 to the crypto operation request 416.

The HSM 412 may be further configured to make the decision based on a result of a comparison 493 of the key type, key length, and key token of the slot key-information to the request key type, request key length, and request key token of the request key-information, respectively. The HSM 412 may be further configured to make the decision to deny the crypto operation request 416 based on the result of the comparison indicating a mismatch.

Figure 5:
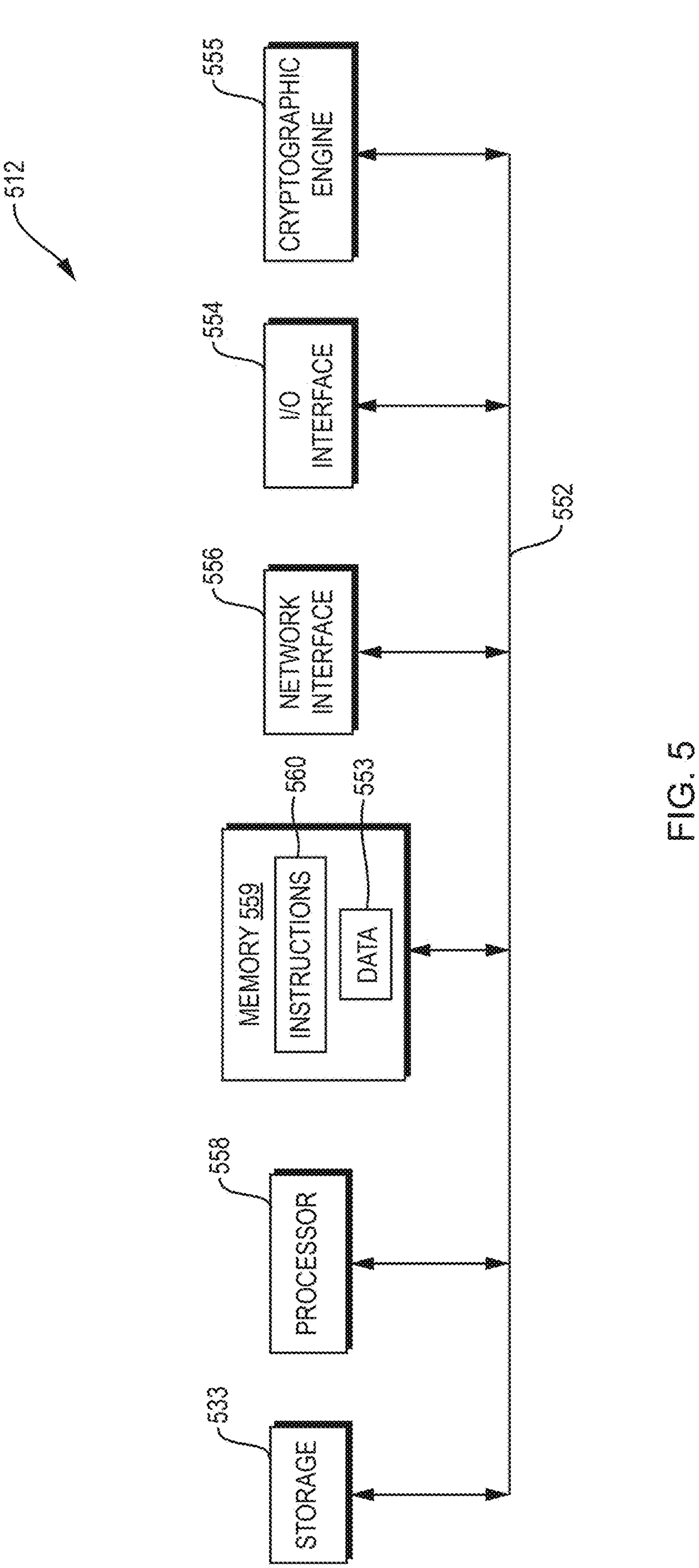
FIG. 5 is a block diagram of an example internal structure of a HSM optionally within an embodiment disclosed herein.

FIG. 5 is a block diagram of a non-limiting example internal structure of a HSM 512 optionally within an embodiment disclosed herein. For non-limiting example, the HSM 512 contains a system bus 552, where a bus is a set of hardware lines used for data transfer among the components of the HSM 512. The system bus 552 is essentially a shared conduit that connects different elements of the HSM 512 (e.g., processor, disk storage, memory, input/output ports, network ports, etc.) that enables the transfer of information between the elements. Coupled to the system bus 552 is an I/O device interface 554 for connecting various input and output devices to the HSM 512. A network interface 556 allows the HSM 512 to connect to various other devices attached to a network (e.g., global computer network, wide area network, local area network, etc.). Memory 559 provides volatile or non-volatile storage for computer software instructions 560 and data 553 that may be used to implement embodiments of the present disclosure, such as the methods 600 and 700 of FIG. 6 and FIG. 7, respectively, disclosed further below, where the volatile and non-volatile memories are examples of non-transitory media. Continuing with reference to FIG. 5, disk storage 533 also provides non-volatile storage for the HSM 512 software instructions 560 and data 553 that may be used to implement embodiments (e.g., methods 600, 700) of the present disclosure. A processor 558 is also coupled to the system bus 552 and provides for the execution of computer instructions while a cryptographic engine 555 coupled to the system bus 552 provides for the execution of cryptographic operations.

Figure 6:
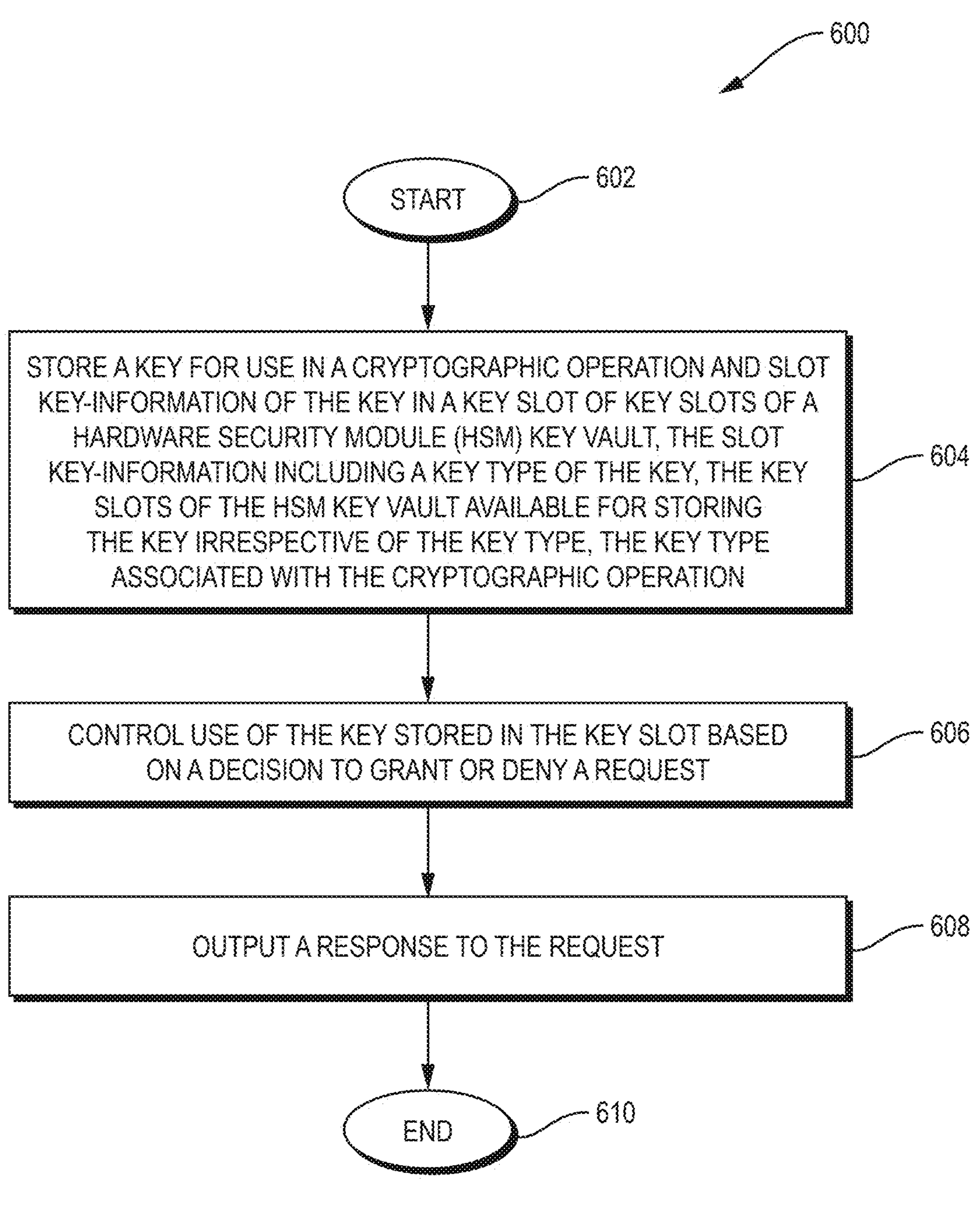
FIG. 6 is a flow diagram of an example embodiment of a method.

FIG. 6 is a flow diagram of an example embodiment of a method 600. The method begins (602) and may comprise storing a key for use in a cryptographic operation and slot key-information of the key in a key slot of key slots of a hardware security module (HSM) key vault (604). The slot key-information may include a key type of the key. The key slots of the HSM key vault may be available for storing the key irrespective of the key type. The key type may be associated with the cryptographic operation. The method may further comprise controlling use of the key stored in the key slot based on a decision to grant or deny a request (606). The request may include request key-information and a slot identifier of the key slot. The controlling may include locating the key slot via the slot identifier and making the decision based on the request key-information of the request and the slot key-information stored in the key slot located. The method may further comprise outputting a response to the request (608). The response output may indicate the decision made. The method thereafter ends (610), in the example embodiment.

Figure 7:
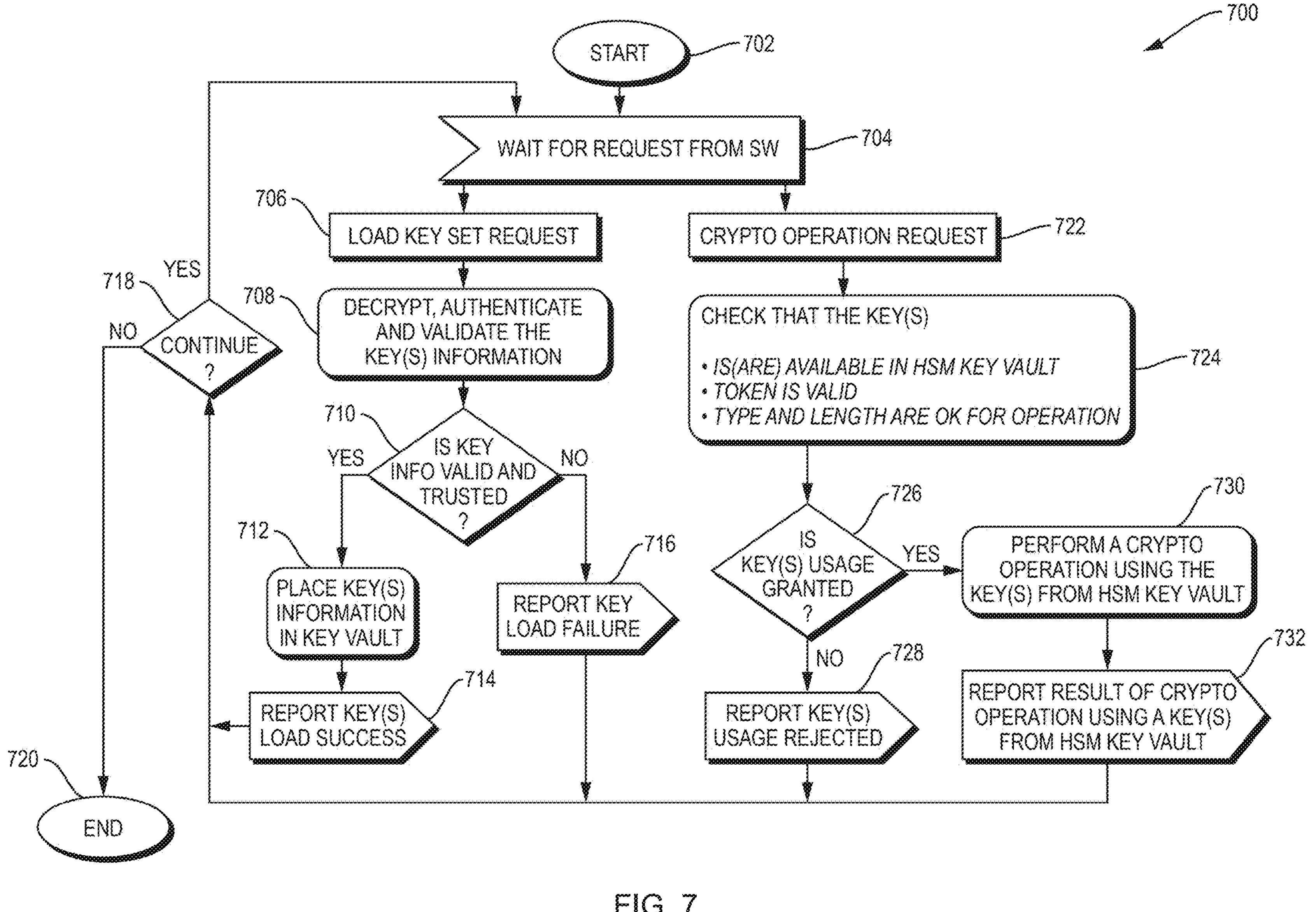
FIG. 7 is a flow diagram of an example embodiment of a method for performing HSM key vault operations.

FIG. 7 is a flow diagram of an example embodiment of a method 700 for performing HSM key vault operations by a HSM disclosed herein. The method begins (702) and waits (704) for a request from an initiator, such as software (SW) for non-limiting example. If a load key-set request (706) to load key(s) into a HSM key vault is received, the method may decrypt, authenticate, and validate key(s) information (708) of the load key-set request. The method may check (710) for whether such key(s) information is valid and trusted. If yes, the method may place (712), that is, store, such key(s) information in the HSM key vault and report (714) key(s) load success to the initiator. The method may then check (718) for whether to continue and, if the decision is not to continue, the method thereafter ends (720) in the example embodiment. If, however, the check (718) yields a decision to continue, the method again waits (704) for a request from an initiator. If, however, the check (710) for whether the key(s) information is valid and trusted is negative, the method may report (716) key load failure and proceed to check (718) for whether to continue, as disclosed above.

If a crypto operation request (722) to perform a crypto operation using key(s) from the HSM key vault is received, the method may proceed to check (724) that such key(s) is/are available in the HSM key vault, whether token(s)/key type(s)/key length(s), specified with such request. matches token(s)/key type(s)/key length(s) of the key(s) stored in respective key slot(s) with the key(s) in the HSM key vault to determine whether to such key(s) usage is denied or granted. If the check (726) for whether the key(s) usage is granted yields yes, the HSM may perform (730) the crypto operation using the key(s) from the HSM key vault and report (732) a result of the crypto operation performed using the key(s) from the HSM key vault.

The method may then proceed to check (718) for whether to continue and, if the decision is not to continue, the method thereafter ends (720) in the example embodiment. If, however, the check (718) yields a decision to continue, the method again waits (704) for a request from an initiator. If, however, the check (710) for whether the key(s) information is valid and trusted is negative, the method may report (716) key load failure and proceed to check (718) for whether to continue, as disclosed above. If however, the check (726) for whether the key(s) usage is granted yields no, the method may report (728) that the key(s) usage was rejected (denied) and and proceed to check (718) for whether to continue, as disclosed above.

As used herein, the term "engine," "module," or "logic" may refer to any hardware, software, firmware, electronic control component, processing logic, and/or processor device, individually or in any combination, including without limitation: an application specific integrated circuit (ASIC), a field-programmable gate-array (FPGA), an electronic circuit, a processor and memory that executes one or more software or firmware programs, and/or other suitable components that provide the described functionality.

Further example embodiments disclosed herein may be configured using a computer program product; for example, controls may be programmed in software for implementing example embodiments. Further example embodiments may include a non-transitory computer-readable-medium that contains instructions that may be executed by a processor, and, when loaded and executed, cause the processor to complete methods and techniques described herein. It should be understood that elements of the block and flow diagrams may be implemented in software or hardware, such as via one or more arrangements of the circuitry of FIG. 5, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A device comprising:

a hardware security module (HSM) key vault including key slots; and a HSM configured to store a key for use in a cryptographic operation and slot key-information of the key in a key slot of the key slots, the slot key-information including a key type, key length, and key token of the key, the key slots of the HSM key vault available for storing the key irrespective of the key type, the key type associated with the cryptographic operation, the HSM further configured to control use of the key stored in the key slot based on a decision to grant or deny a request, the request including request key-information and a slot identifier of the key slot, the HSM further configured to locate the key slot via the slot identifier, make the decision based on a request key type, request key length, and request key token of the request key-information of the request and the key type, key length, and key token of the slot key-information stored in the key slot located, and output a response to the request, the response output indicating the decision made.

2. The device of claim 1, wherein direct access to the HSM key vault is exclusive to the HSM.

3. The device of claim 1, wherein the HSM is further configured to:

based on the decision made to grant the request, perform the cryptographic operation and configure the response output to indicate that the request was performed; and based on the decision made to deny the request, configure the response output to indicate that the request was not performed.

4. The device of claim 1, wherein the key slots are arranged as an array of key slots and wherein the slot identifier is an index into the array.

5. The device of claim 1, wherein each key slot of the key slots of the HSM key vault is a general-purpose key slot, wherein the general-purpose key slot is a reusable key slot for storing keys of different lengths, keys of different key types, and keys for use in different cryptographic operations.

6. The device of claim 1, wherein the key slot includes a key length field, key type field, key data field, and key token field for storing the key length of the key, the key type of the key, the key, and the key token for the key, respectively.

7. The device of claim 1, wherein the key token represents a password for using the key stored in the key slot of the key slots of the HSM key vault.

8. The device of claim 1, wherein the request key-information includes the request key type, request key length, and request key token, and wherein the HSM is further configured to make the decision based on a result of a comparison of the key type, key length, and key token of the slot key-information to the request key type, request key length, and request key token of the request key-information, respectively.

9. The device of claim 8, wherein the HSM is further configured to:

make the decision to grant the request based on the result of the comparison indicating that the key type, key length, and key token of the slot key-information match the request key type, request key length, and request key token of the request key-information, respectively; and make the decision to deny the request based on the result of the comparison indicating a mismatch.

10. The device of claim 1, wherein the request key-information includes the request key type, request key length, and request key token, wherein the request further includes at least one parameter, and wherein the HSM is further configured to:

make the decision to grant the request based on the key type, key length, and key token of the slot key-information matching the request key type, request key length, and request key token of the request key-information, respectively; and perform the cryptographic operation based on the decision made to grant the request, wherein the cryptographic operation is performed using the key and the at least one parameter.

11. The device of claim 1, wherein the HSM is further configured to store, in an unencrypted form, the key and the slot key-information in the key slot of the HSM key vault.

12. The device of claim 1, wherein the request is a cryptographic-operation request and wherein the HSM is further configured to:

process a load key-set request received from an initiator, the load key-set request including key-set location information and key-set slot information, the key-set location information including location information for locating a protected version of a key set, wherein the protected version is in an encrypted form, and wherein, to process the load key-set request, the HSM is further configured to:

locate the protected version of the key set in a memory based on the location information included in the key-set location information, wherein the memory is external to the HSM;

load, from the memory, the protected version located in the memory;

use at least one cryptographic key provisioned on the HSM to unprotect the protected version loaded to produce an unprotected version of the key set, the unprotected version of the key set including, in an unencrypted form, the key, the key type, and the key length of the key;

generate a respective key token for each key included in the unprotected version of the key set, thereby generating the key token for the key;

store the unprotected version of the key set in the HSM key vault based on the key-set slot information of the load key-set request, thereby storing the key and slot key-information of the key in the key slot; and output a load key-set response to the initiator, the load key-set response including each respective key token generated.

13. The device of claim 12, wherein a cryptographic key of the at least one cryptographic key is an Advanced Encryption Standard (AES)-based key, or another type of key used for decrypting data.

14. The device of claim 1, wherein the HSM is further configured to:

produce a protected version of a key set based on a store key-set request received from an initiator, the key set including the key, the key type, and the key length of the key stored in the key slot; and store, in memory external to the HSM, the protected version of the key set produced.

15. The device of claim 1, wherein the HSM includes at least one processor and at least one memory with computer code instructions stored thereon, the at least one processor and the at least one memory, with the computer code instructions, configured to cause the HSM to store the key, control use of the key, and output the response.

16. The device of claim 1, wherein HSM key vault is an internal memory of the HSM, an external memory of the HSM, a set of hardware registers of the HSM, or another storage element of the HSM for which direct access is exclusive to the HSM.

17. The device of claim 1, wherein the device is a system-on-chip (SoC) and wherein the HSM is an embedded HSM (eHSM) of the SoC.

18. A method comprising:

storing a key for use in a cryptographic operation and slot key-information of the key in a key slot of key slots of a hardware security module (HSM) key vault, the slot key-information including a key type, key length, and key token of the key, the key slots of the HSM key vault available for storing the key irrespective of the key type, the key type associated with the cryptographic operation;

controlling use of the key stored in the key slot based on a decision to grant or deny a request, the request including request key-information and a slot identifier of the key slot, the controlling including locating the key slot via the slot identifier and making the decision based on a request key type, request key length, and request key token of the request key-information of the request and the key type, key length, and key token of the slot key-information stored in the key slot located; and outputting a response to the request, the response output indicating the decision made.

19. The method of claim 18, further comprising accessing the HSM key vault, directly, by the HSM, exclusively.

20. The method of claim 18, further comprising:

based on the decision made to grant the request, performing the cryptographic operation and configuring the response output to indicate that the request was performed; and based on the decision made to deny the request, configuring the response output to indicate that the request was not performed.

21. The method of claim 18, wherein the key slots are arranged as an array of key slots and wherein the method further comprises using the slot identifier as an index into the array.

22. The method of claim 18, wherein each key slot of the key slots of the HSM key vault is a general-purpose key slot and wherein the method further comprises reusing the general-purpose key slot for storing keys of different lengths, keys of different key types, and keys for use in different cryptographic operations.

23. The method of claim 18, further comprising storing the key length of the key, the key type of the key, the key, and the key token for the key, in a key length field, key type field, key data field, and key token field of the key slot, respectively.

24. The method of claim 18, wherein the key token represents a password for using the key stored in the key slot of the key slots of the HSM key vault, wherein the request key-information includes the request key token, and wherein making the decision includes comparing the request key token of the request to the key token of the slot key-information.

25. The method of claim 18, wherein the request key-information includes the request key type, request key length, and request key token, and wherein the method further comprises making the decision based on a result of a comparison of the key type, key length, and key token of the slot key-information to the request key type, request key length, and request key token of the request key-information, respectively.

26. The method of claim 25, further comprising:

making the decision to grant the request based on the result of the comparison indicating that the key type, key length, and key token of the slot key-information match the key type, key length, and key token of the request key-information, respectively; and making the decision to deny the request based on the result of the comparison indicating a mismatch.

27. The method of claim 18, wherein the request key-information includes the request key type, request key length, and request key token, wherein the request further includes at least one parameter, and wherein the method further comprises:

making the decision to grant the request based on the key type, key length, and key token of the slot key-information matching a request key type, request key length, and request key token of the request key-information, respectively; and performing the cryptographic operation based on the decision made to grant the request, wherein performing the cryptographic operation includes using the key and the at least one parameter.

28. The method of claim 18, further comprising store, in an unencrypted form, the key and the slot key-information in the key slot of the HSM key vault.

29. The method of claim 18, wherein the request is a cryptographic-operation request and wherein the method further comprises:

processing a load key-set request received from an initiator, the load key-set request including key-set location information and key-set slot information, the key-set location information including location information for locating a protected version of a key set, wherein the protected version is in an encrypted form, and wherein processing the load key-set request includes:

locating the protected version of the key set in a memory based on the location information included in the key-set location information, wherein the memory is external to the HSM;

loading, from the memory, the protected version located in the memory;

using at least one cryptographic key provisioned on the HSM to unprotect the protected version loaded to produce an unprotected version of the key set, the unprotected version of the key set including, in an unencrypted form, the key, the key type, and the key length of the key;

generating a respective key token for each key included in the unprotected version of the key set, thereby generating the key token for the key;

storing the unprotected version of the key set in the HSM key vault based on the key-set slot information of the load key-set request, thereby storing the key and slot key-information of the key in the key slot; and outputting a load key-set response to the initiator, the load key-set response including each respective key token generated.

30. The method of claim 29, wherein a cryptographic key of the at least one cryptographic key is an Advanced Encryption Standard (AES)-based key, or another type of key used for decrypting data.

31. The method of claim 18, further comprising:

producing a protected version of a key set based on a store key-set request received from an initiator, the key set including the key, the key type, and the key length of the key stored in the key slot; and storing, in memory external to the HSM, the protected version of the key set produced.

32. An apparatus comprising:

means for storing a key for use in a cryptographic operation and slot key-information of the key in a key slot of key slots of a hardware security module (HSM) key vault, the slot key-information including a key type, key length, and key token of the key, the key slots of the HSM key vault available for storing the key irrespective of the key type, the key type associated with the cryptographic operation;

means for controlling use of the key stored in the key slot based on a decision to grant or deny a request, the request including request key-information and a slot identifier of the key slot, the controlling including locating the key slot via the slot identifier and making the decision based on a request key type, request key length, and request key token of the request key-information of the request and the key type, key length, and key token of the slot key-information stored in the key slot located; and means for outputting a response to the request, the response output indicating the decision made.

* * * * *